United States Patent [19]
Mitsui et al.

[11] Patent Number: 5,734,457
[45] Date of Patent: Mar. 31, 1998

[54] COLOR DISPLAY DEVICE HAVING ABSORPTIVE AND REFLECTIVE COLOR FILTERS

[75] Inventors: Seiichi Mitsui, Kashiwa; Shigeru Aomori, Abiko; Atsushi Tanaka, Kashiwa, all of Japan

[73] Assignee: Sharp Kabushiki Kaisha, Osaka, Japan

[21] Appl. No.: 652,788

[22] Filed: May 23, 1996

[30] Foreign Application Priority Data

May 25, 1995 [JP] Japan .................................. 7-126910

[51] Int. Cl.[6] .................................................. G02F 1/1335
[52] U.S. Cl. ...................................... 349/106; 349/105
[58] Field of Search ........................ 359/15, 891; 349/104, 349/105, 106, 113, 114, 115, 65

[56] References Cited

U.S. PATENT DOCUMENTS

| | | | |
|---|---|---|---|
| 4,822,144 | 4/1989 | Vriens | 349/105 |
| 4,822,617 | 4/1989 | Vriens | 349/71 |
| 5,029,986 | 7/1991 | De Vaan | 349/113 |
| 5,058,997 | 10/1991 | Dickerson et al. | 349/105 |
| 5,146,355 | 9/1992 | Prince et al. | 349/71 |
| 5,442,467 | 8/1995 | Silverstein et al. | 349/159 |
| 5,526,145 | 6/1996 | Weber | 359/15 |
| 5,566,007 | 10/1996 | Ikeda et al. | 349/104 |

FOREIGN PATENT DOCUMENTS

| | | |
|---|---|---|
| 2-149 881 | 6/1990 | Japan . |
| 4-113 324 | 4/1992 | Japan . |
| 6-075 238 | 3/1994 | Japan . |

OTHER PUBLICATIONS

Partial translation of Japanese Laid-Open Patent Publication No.: 2-149881, Ukai, published Jun. '90.
Partial translation of Japanese Laid-Open Patent Publication No.: 4-113324, Kondo et al., published Apr. '92.
Partial translation of Japanese Laid-Open Patent Publication No.: 6-75238, Mitsui et al., published Mar. '94.
T. Uchida, *liquid crystal display technology of the next generation*, (ISBN 4-7693-1132-X C3055), pp. 115-126 (1994).
R. Maurer, et al., "Cholesteric Reflectors with a Color Pattern", *SID 94 Digest*, paper 26.1; pp. 399-402 (Society for Information Display, 1994).

*Primary Examiner*—William L. Sikes
*Assistant Examiner*—Tai V. Duong
*Attorney, Agent, or Firm*—David G. Conlin; Milton Oliver

[57] ABSTRACT

A color display device includes a display medium; a display-side substrate including electrodes for driving the display medium; a counter substrate opposed to the display-side substrate with the display medium therebetween and including electrodes or driving the display medium; a first absorptive color filter provided on the display-side substrate; a second reflective color filter provided on a face opposite to the display-side substrate of the first color filter for reflecting light having a complementary color of light transmitted through the first color filter; and reflecting means provided on a face opposite to the first color filter of the second color filter.

8 Claims, 6 Drawing Sheets

COLOR DISPLAY DEVICE HAVING ABSORPTIVE AND REFLECTIVE COLOR FILTERS

BACKGROUND OF THE INVENTION

1. Field of the Invention

The present invention relates to a color display device suitable for use in office automation (OA) equipment such as word processors, notebook-type personal computers, and a variety of video and game equipment.

2. Description of the Related Art

Application of a liquid crystal display device to a word processor, a laptop personal computer, or a portable television receiver referred to as a pocket TV set has been rapidly developed in recent years. A TN (twisted nematic) mode and an STN (super twisted nematic) mode are conventionally used in liquid crystal display devices.

A liquid crystal display device employing a TN mode has a structure in which a liquid crystal display cell is disposed between a pair of polarizing plates. In such a liquid crystal display device, monochromatic (black and white) display is conducted by utilizing an optical property (switching characteristic) of the liquid crystal display cell. The liquid crystal layer of the TN mode liquid crystal display cell, which has an orientation for conducting a display in a TN mode, has optical rotatory power under conditions of zero applied voltage and does not have an optical rotatory characteristic under application of a voltage.

Moreover, a color display using the TN mode liquid Crystal display cell has been developed. For example, small-sized color filters of red, blue and green are provided on every display pixel of a liquid crystal display device to effect a multicolor display or a full-color display by additive color mixing through utilization of a switching characteristic of the TN mode liquid crystal cell. This principle is widely employed in an active matrix or a simple matrix color liquid crystal display device at the present. Among them, an active matrix TFT-LCD is taken as an example and will be described below.

The active matrix TFT-LCD is a display device where arrays of liquid crystal display pixels and thin film transistors (hereinafter, referred to as TFT) for selectively applying a voltage to the display pixel are disposed on one of a pair of substrates. Scanning lines (gate lines) are horizontally disposed, and data lines are vertically disposed in accordance with the number of display pixels. The active matrix TFT-LCD having a screen with a diagonal size of 25 cm to 38 cm has been developed for office automation equipment. For a personal computer, 480 scanning lines and 640×3 (corresponding to red, green and blue) data lines are disposed.

FIG. 6 illustrates a cross sectional view of one color display pixel in a conventional active matrix color liquid Crystal display panel. The structure of the conventional color liquid crystal display panel will be described below. With regards to this invention, one color display pixel is defined as the smallest unit area of a display for conducting a color display and includes at least two color picture elements. Typically, the color display pixel includes three primary color picture elements, i.e., red, Green and blue picture elements.

The liquid crystal display device includes a liquid crystal display cell 600 and a backlight 601. The liquid crystal display cell 600 includes transparent substrates 13a and 13b typically made of glass, closely opposed to each other, and a liquid crystal layer 12 including liquid crystal molecules 12a interposed between the transparent substrates 13a and 13b. Spacers (not shown) are disposed between the transparent substrates 13a and 13b in their peripheral areas. A plurality of picture element electrodes 24 are formed on the inner face of one of the transparent substrates 13b. TFTs 25 are formed corresponding to the respective picture element electrodes 24. Drain portions of the TFTs 25 are connected to the picture element electrodes 24. An alignment film 27 for aligning the liquid crystal molecules 12a of the liquid crystal layer 12 is formed on the entire inner face of the substrate 13b, covering the picture element electrodes 24 and the TFTs 25.

On the inner face of the other transparent substrate 13a, a transparent common electrode 23 is formed so as oppose the plurality of picture element electrodes 24. A color picture element is defined by a portion where the picture element electrodes 24 and the common electrode 23 are opposed to each other. A color filter layer 14, which has a red filter 15(R), a green filter 16(G) and a blue filter 17(B) and black masks 14a, is formed on the surface facing the liquid crystal layer 12 of the transparent substrate 13a. The red, blue and green filters 15(R), 16(G) and 17(B) of the color filter layer 14 are provided corresponding to each of the picture element electrodes 24 so as to form a color picture element, respectively. The black masks 14a are provided between the color picture elements. A planarization film 22 is formed on the color filter layer 14. In addition, a pair of polarizing plates 28 and 29 are attached to the outer faces of the substrates 13a and 13b, respectively. The backlight 601, which is provided in the outside of the substrate 13b of the liquid crystal display cell 600, includes a light source 30, an optical guide plate 31 and a reflecting film 32.

The color filters are classified based on the method used for producing the color filters which selectively absorb light of a specific wavelength range. For example, methods such as a dyeing method, a pigment dispersing method, a printing method, an electro-deposition method are widely used for producing color filter layers. These color filter layers are formed of an organic resin and a dye material or pigment mixed with the organic resin. Namely, the color filter layer utilizes the characteristic of the dye material or pigment for selectively absorbing light. These color filter layers are described in detail in "Liquid crystal display technology of the next generation" edited by T. Uchida: Industrial investigation association pp. 115–126. A thin interference color filter layer made of an inorganic material is also known (e.g., Japanese Laid-Open Patent Publication Nos. 2-149881 and 4-113324). The interference type color filter layer selectively transmits light and reflects unselected light without absorbing light. Accordingly, this type of color filter layer is suitable for a projection type display device which requires light stability.

The problem of the conventional liquid crystal display device is that its transmittance is as low as several percentages. The transmittance is represented by the following equation:

$$(Transmittance)=A \times B \times C \times D.$$

where

A represents the aperture ratio of a TFT array;

B represents the transmittance of the liquid crystal layer;

C represents the transmittance of the two polarizing plates; and

D represents the transmittance of the color filter layer.

Herein, typical values are shown in Table 1 below.

TABLE 1

| | |
|---|---|
| Aperture ratio of TFT array | 60 to 70% |
| Transmittance of liquid crystal layer | 90 to 95% |
| Transmittance of two polarizing plates | 40% |
| Transmittance of color filter layer | 30% |

A transmittance obtained by calculating with the values shown in Table 1 results in 6.5 to 8%. This means that most of the light emitted from a backlight is not effectively utilized. Due to the low efficiency of light, it is difficult to conduct a color display without a backlight, which consumes power in large amounts. Thus, the achieving of a low power consumption liquid crystal display device with a good transmissive color display is impaired.

SUMMARY OF THE INVENTION

The color display device of this invention, includes a display medium; a display-side substrate including electrodes for driving the display medium; a counter substrate opposed to the display-side substrate with the display medium therebetween and including electrodes for driving the display medium; a first absorptive color filter provided on the display-side substrate; a second reflective color filter provided on a face opposite to the display-side substrate of the first color filter for reflecting light having a complementary color of light transmitted through the first color filter; and reflecting means provided on a face opposite to the first color filter of the second color filter.

In one embodiment of the invention, the second color filter is provided on the display-side substrate so as to form a multilayer together with the first color filter.

In another embodiment of the invention, the second color falter is provided on the side of the counter substrate.

In still another embodiment of the invention, the first color filter is formed by either one of e gelatin dyeing method, a pigment dispersing method, an electro-deposition method or a printing method.

In still another embodiment of the invention, the second color filter is formed by either one of an inorganic multilayer, a volume hologram, chiral nematic liquid crystal, cholesteric liquid crystal or a cholesteric liquid crystal polymer.

Thus, the invention described herein makes possible the advantages of providing a transmissive color display device capable of realizing a low power consumption by significantly improving light efficiency at the color filters, where loss of light is the largest, in order to significantly reduce power consumption associated with backlighting. The present invention can be applied to a reflective color display device. In this case, the present invention makes it possible to provide a bright reflective color display device.

These and other advantages according to the present invention will become apparent to those skilled in the art upon reading and understanding the following detailed description with reference to the accompanying figures.

A color display device of the present invention includes a second color filter layer for reflecting light in addition to a first color filter layer for absorbing light. The first and second color filter layers include a plurality of color filters, respectively. The second color filter layer is provided on the face opposite to the display surface of the first color filter layer. The second color filter layer reflects light having a complementary color of that of light transmitted through the first color filter layer. As a result, although the light which is not used by a color filter is absorbed in the color filter in the conventional structure, the light is reflected by the second reflective color filter to the opposite side of the first color filter layer, before entering the first color filter layer. The light reflected by the second color filter layer is reflected toward the first and second color filter layers by a reflector. In this manner, the reflected light between the second color filter layer and the reflector ultimately reaches a portion (a color filter) of the second color filter layer which transmits the light, Then the light passes through the second color filter layer. The light transmitted through the second color filter layer passes through the first color filter layer, and is thus visually recognized by a viewer. Thus, although light is absorbed in the conventional structure, according to the present invention, the light is reflected to the opposite side of the first color filter layer by the second color filter layer, and enters a portion of the first and second color filter layers where the reflected light can be utilized. Thus, the light which is conventionally absorbed can now contribute to the color display. Namely, according to the invention, light is utilized more efficiently.

The underpinning principles, in the case where the present invention is adapted to a transmissive color display device 100, will now be described with reference to FIG. 1. Herein, a red picture element is used as an example.

The transmissive color display device 100 is provided with a backlight 101. White light (W) emitted from a light source 1a of the backlight 101 is introduced to the transmissive color display device 100 through a reflector 1b and an optical guide plate 1c, and passes through a transparent substrate 13b and a liquid crystal layer (i.e., a display medium) 2.

The white light (W) incident on the transmissive color display device 100 enters a second color filter 3a(R) in a second, reflective color filter layer 3, for example. The second color filter 3a(R) reflects light having a wavelength range of cyan (i.e., transmitting red light). The red light (R) transmitted through the second color filter 3a(R) further passes through a first color filter 4a(R) of a first absorptive color filter layers 4-the first color filter 4a(R) transmitting red light 6(R), and then through a transparent substrate 13a. Thus, a viewer 5 recognizes the red light 6(R). On the other hand, cyan light 7 (C) reflected by the second color filter 3a(R) passes through the liquid crystal layer 2 again, and returns to the backlight 101. There, the light is again reflected by the reflector (reflecting plate) 1b, and then passes through the first and second color filter layers 4 and 3 for transmitting green light 8(G) or blue light 9 (B) through respective first and second color filters 3b(G), 4b(G) and 3c(B), 4c(B). As a result, although cyan light is absorbed by a red color filter in the conventional structure, substantially no cyan light is absorbed by the red color filter 4a(R) in the present invention due to it being reflected by the second color filter 3a(R), thus utilizing light three times more efficiently than conventional display devices. Herein, the red picture element has been described, but green and blue picture elements work in the same manner—the red, green and blue picture elements defining a color display pixel. Black masks 3d and 4d are formed between the color filters in the first and second color filter layers 4 and 3, respectively. According to the structure of the color display device 100 of the present example, with regard to the light from the backlight, light energy absorbed in the first and second color filter layers 4 and 3 is substantially zero. Furthermore, since ambient light 10 on the side of the viewer 5 is absorbed by the first absorptive colorfilter layer 4, no reflection from the second reflective color filter layer 3 toward the viewer 5 occurs.

Next, the underpinning principles behind the case where the present invention is adapted to a reflective color display device 200 will be described with reference to FIG. 2. Herein, again, a red picture element is used as an example.

Ambient light 10 incident from a viewer 5 first enters a first absorptive color filter layer 4 via transparent substrate 13a. Out of the incident light, red light passes through the first color filter 4a(R). Namely, the cyan light is absorbed in the first color filter layer. The red light transmitted through the first color filter 4a(R) passes through a second reflective color filter 3a(R). The transmitted red light passes through a liquid crystal layer 2, (i.e., a display medium), and is reflected by a reflecting plate 11 located on the face of a counter substrate 13b. Then, the light returns to the red picture element from which the light has been incident. This light is visually recognized by the viewer 5. In this case, the ambient light 10 is incident to the display device at various angles, and is further scattered by the reflecting plate. As a result, all light does not necessarily pass through the same picture element that the light is incident through. Accordingly, in a display having the conventional structure, light transmitted through a red picture element is reflected by the reflecting plate, and may enter adjacent green or blue picture elements. Such a light is absorbed by the color filters. However, in the color display device of the present invention, light directed to green or blue picture elements is again reflected toward the reflecting plate by the second color filters 3b(G) and 3c(B). Thus, the light reaches the viewer 5 through any one of the surrounding red picture elements, thereby enhancing light utilization efficiency.

Both in the case of the transmissive color display device and in the case of the reflective display device, the second color filter layer can be formed on the first color filter layer on the substrate for display on the side of the viewer. Alternatively, the second color filter layer can be provided on the side of the counter substrate. In both the cases, light can be utilized more efficiently, as described above.

The above-mentioned first absorptive color filter layer 4 is formed by either One of a gelatine dyeing method, a pigment dispersing method, an electro-deposition method or a printing method. Any suitable filter can be used, provided that it functions in the same manner as described above.

Furthermore, the second reflective color filter layer 3 is formed of either one of an inorganic multilayer film, a volume hologram, chiral nematic liquid crystal, cholesteric liquid crystal or a cholesteric liquid crystal polymer. Any type of filter can be used, provided that it functions in the same manner as described above. Generally, these reflective color filters have a large dependance on viewing angles. However, in the present invention, the first absorptive color filter layer is provided on the side of the display surface. Accordingly, whether the present invention is applied to the transmissive display device or the reflective display device, the color filter layer has a slight dependance on the viewing angle.

DESCRIPTION OF THE PREFERRED EMBODIMENTS

The present invention will be described by way of examples below.

Example 1

Figure 1:
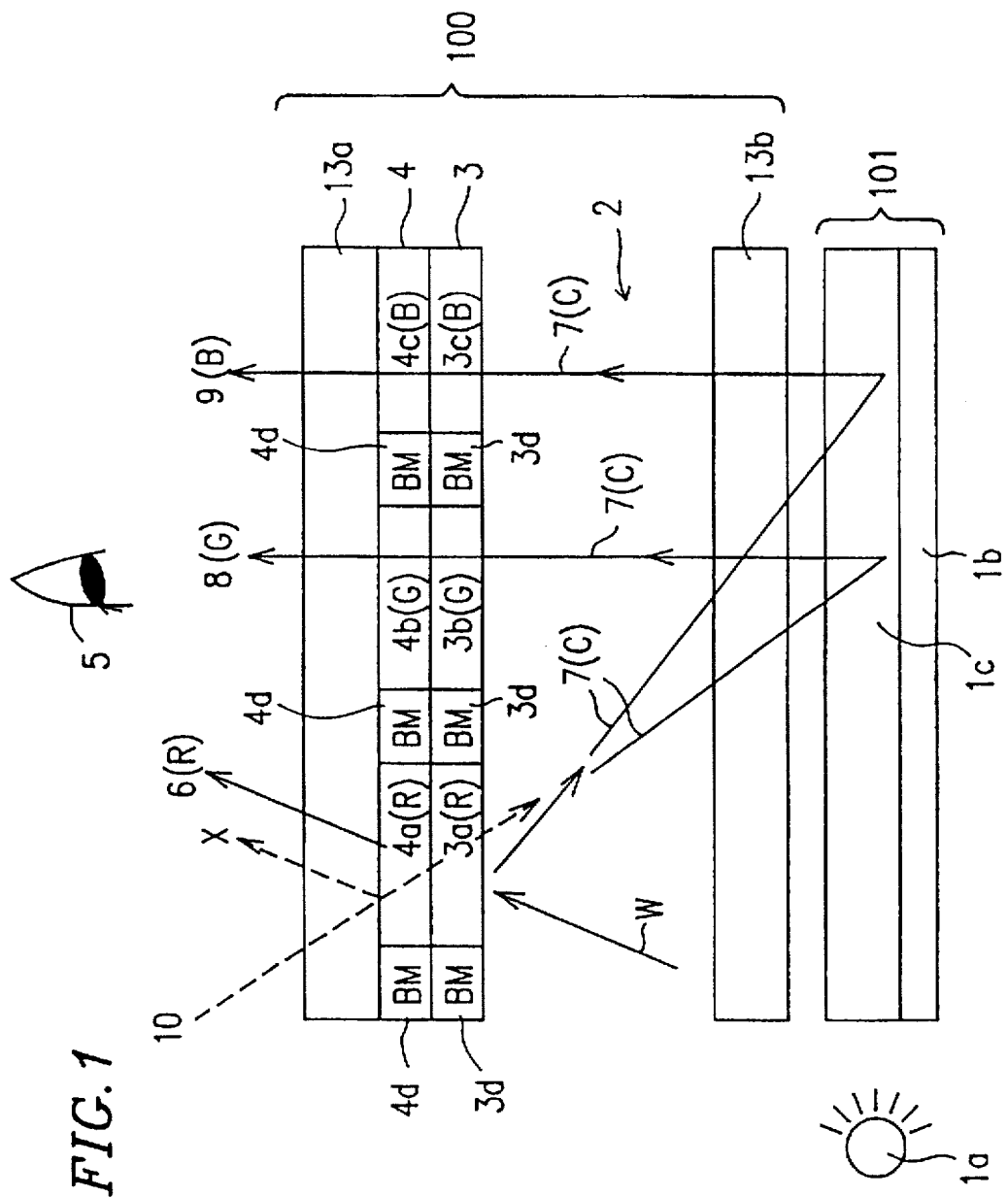
FIG. 1 is a schematic view illustrating the principle of a transmissive display device according to the present invention.
Figure 2:
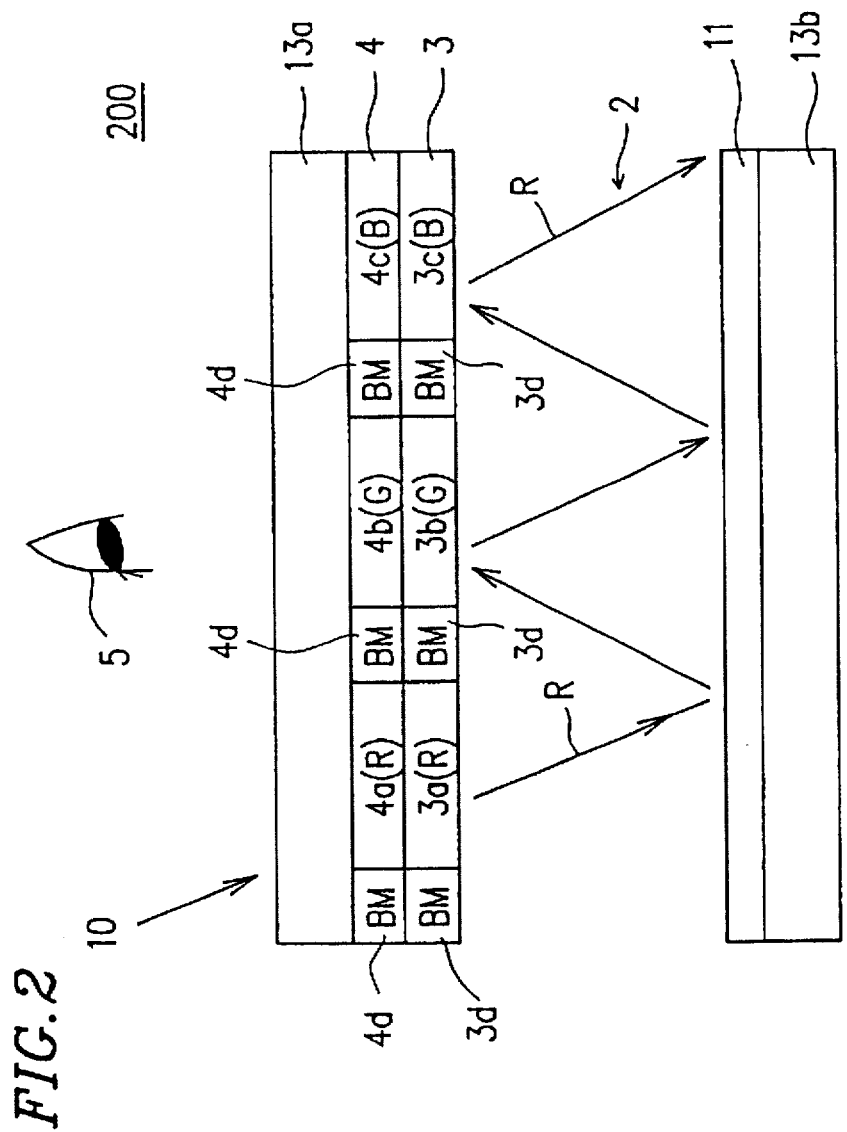
FIG. 2 is a schematic view illustrating the principle of a reflective display device according to the present invention.
Figure 3:
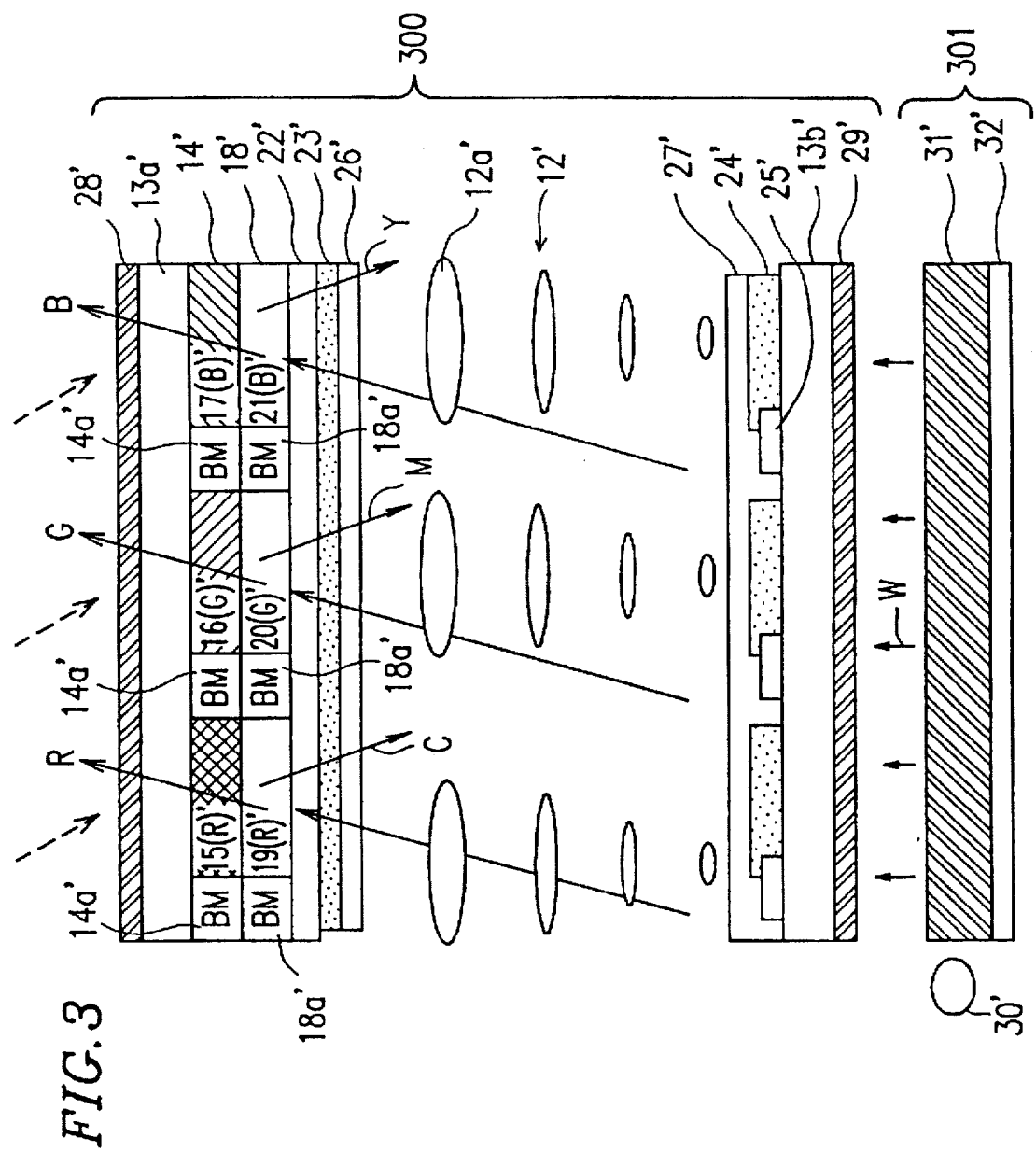
FIG. 3 is a cross sectional view illustrating one color display pixel of an active matrix color liquid crystal display device in Example 1 of the present invention.

Referring now to FIG. 3, a cross sectional view of one embodiment of a color display pixel for an active matrix color liquid crystal display device according to the present invention is illustrated. The one color display pixel consists of three picture elements for red, green and blue colors. A transmissive liquid crystal display device of the present example will now be described below.

The liquid crystal display device of the present example includes a liquid crystal display panel 300 and a backlight 301. The liquid crystal display panel 300 includes a liquid crystal cell including a liquid crystal layer 12' working as a display medium and a pair of transparent substrates 13a' and 13b' opposed to each other. The liquid crystal layer 12' including liquid crystal molecules 12a' is interposed between the pair of transparent substrates 13a' and 13b'. Nematic liquid crystal which has molecules twisted at an angle of 90° is used for the liquid crystal layer 12'.

A first color filter layer 14' formed by dispersing pigment to selectively transmit red, green and blue light is provided on the surface facing the liquid crystal layer 12' of the substrate 13a' which is disposed near to a viewer. As shown in FIG. 3, in the first color filter layer 14', a red color filter 15(R)', a green color filter 16(G)' and a blue color filter 17(B)' are aligned so that each color filter corresponds to a single picture element in the one color display pixel. Black masks 14a' are provided between the color filters 15(R)', 16(G)' and 17(B)'. In the present example, color filters of red, green and blue 15(R)', 16(G)' and 17(B)' are adjacently aligned to form a strip for example.

A second color filter layer 18' is provided on the surface facing the liquid crystal layer 12' of the first color filter layer 14'. Herein, a reflective volume hologram optical color filter is used for the second color filter layer 18'. Color filters in the second color filter layer 18' are selected so as to reflect light of a complementary color to the light transmitted through the first color filter layer 14'. More specifically, a color filter 19(R)' for reflecting cyan light (i.e., transmitting red light) is selected with respect to the red color filter 15(R)'. A color filter 20(G)' for reflecting magenta light (i.e., transmitting green light) is selected with respect to the green color filter 16(G)'. A color filter 21(B)' for reflecting yellow light (i.e., transmitting blue light) is selected with respect to the blue color filter 17(B)'. Black masks 18a' are provided between the color filters 19(R)', 20(G)' and 21(B)' in the same manner as in the case of the first color filter layer 14'.

A transparent planarization film 22' is formed on the surface facing the liquid crystal layer 12' of the second color filter layer 18'. A transparent electrode 23' functioning as a common electrode for picture elements is formed on the surface facing the liquid crystal layer 12' of the planarization film 22'. On the other substrate 13b', a transparent electrode 24' functioning as a picture element electrode and a TFT 25' are formed for every picture element on its surface facing the liquid crystal layer 12'. Alignment films 26' and 27' made of polyimide for aligning the liquid crystal are applied onto transparent electrodes 23' and 24', respectively.

The liquid crystal display panel 300 further includes polarizing plates 28' and 29' attached to the outer faces of the transparent substrates 13a' and 13b' of the liquid crystal display cell, respectively.

The backlight 301 is provided outside of the liquid crystal display panel 300, and includes a light source 30', an optical guide plate 31' and a reflecting film 32'.

In the present example, the liquid crystal display panel 300 having the above-mentioned structure is produced in the following manner:

First, the color filter layer 14' being of an absorptive type is formed on the transparent substrate 13a' made of barium borosilicate glass, sodium glass, plastic, quartz glass or the like. A color filter obtained by a pigment dispersion method can be used for the absorptive color filter layer 14', for example. This type of color filter is produced in the following manner:

A photosensitive dye resist in which a red pigment is uniformly dispersed in a transparent photosensitive resin is applied onto the glass substrate 13a'. More specifically, CR 2000 manufactured by Fuji-Hunt Electronics Technology Co., Ltd. is employed to form a film with a thickness of 2.0 μm by using a spin-coating method and spinning at 650 rpm. Thereafter, the film is prebaked at 80° C. for 60 minutes and exposed via a predetermined development mask. Then, the film is baked at 220° C. for 30 minutes to form a pattern of red filters. Similarly, CG-2000, CB-2000 and CK-2000 manufactured by Fuji-Hunt Electronics Technology Co., Ltd. are subjected to the same process as above to form patterns of green filters, blue filters and black masks, respectively—thus, forming a first color filter layer 14'.

Still referring to Example 1, a second reflective color filter layer 18' is disposed on the first color filter layer 14'. A volume hologram optical color filter is used for the second color filter layer 18' for example. The volume hologram optical color filter is produced in the following manner:

A photosensitive layer and a mirror are attached with a predetermined mask disposed thereabove (the predetermined mask may be disposed to contact with the photosensitive layer). A laser beam having a red wave-length is vertically radiated. The radiated laser beam interferes with the light reflected from the mirror so that interference stripes are recorded in the exposed portion in parallel to its face (vertical with respect to the incident direction of the laser beam). Such an exposure is sequentially performed several times with a gradual movement of the mask so as to record interference stripes with respect to green and blue. Details about the conditions and technical specifications for this production are shown in Table 2 below.

TABLE 2

| Photosensitive material: |
|---|
| Gelatin dichromate (having an enhanced sensitivity to red as a result of containing methylene blue) |

TABLE 2-continued

| Recording laser: | |
|---|---|
| Blue: | Ar ion laser, power 5 W, 414 nm |
| | Model 220-055 manufactured by Spectra Physics, Ltd. |
| Green: | Ar ion laser, power 5 W, 488 nm |
| | Model 220-055 manufactured by Spectra Physics, Ltd. |
| Red: | Kr laser, power 5 W, 647 nm |
| | Model Innova 200K3 manufactured by Coherent, Ltd. |
| Irradiation time: | 6 seconds |
| Exposure: | 60 mj/cm$^2$ |
| Developing treatment conditions: | |
| Washing in water: | 10 min. |
| IPA and water (3:7) | 1 min. |
| IPA and water (7:3) | 2 min. |
| IPA | 5 min. |
| Drying | 15 min. |

Accordingly, a volume hologram optical color filter is produced for every picture element, as shown in FIG. 3.

The first color filter layer 14' and the second color filter layer 18' are disposed so that respective picture elements overlap each other. The combination thereof is shown in Table 3 below.

TABLE 3

| | Red picture element | Green picture element | Blue picture element |
|---|---|---|---|
| First color filter layer 14 | Transmitting red light, Absorbing cyan light | Transmitting green light, Absorbing magenta light | Transmitting blue light, Absorbing yellow light |
| Second color filter layer 18 | Transmitting red light, Reflecting cyan light | Transmitting green light, Reflecting magenta light | Transmitting blue light, Reflecting yellow light |

As seen from Table 3, light to be transmitted through the first color filter layer 14' is selected so as to have color complementary to that of light reflected by the color filter layer 18'.

An acrylic resin working as the planarization film 22' is coated on the second color filter layer 18' by a spinner. Then, the resultant film is baked at 220° C. for 60 minutes. Furthermore, transparent electrodes 23', for example, ITO is formed to a thickness of 100 nm on the entire surface of the planarization film 22'.

TFTs 25' working as switching devices and transparent electrodes 24' are formed on the substrate 13b' opposed to the substrate 13a'. A light-shielding layer for preventing light from leaking may be formed on the TFTs 25'.

Alignment films (Optomar AL4552 manufactured by Japan Synthetic Rubber Co., Ltd.) 26' and 27' are formed to a thickness of 70 nm on the transparent electrodes 23' and 24' by a printing method. Rubbing direction is set so that liquid crystal molecules are twisted at 90° between the substrates 13a' and 13b'.

The pair of substrates 13a' and 13b' are attached to each other by spacers so that a cell thickness is 4.5 μm. Nematic liquid crystal is injected between the attached substrates 13a' and 13b' to form the liquid crystal layer 12'. In the present invention, ZLI-4792 (manufactured by Merck & Co., Inc.) is used for the liquid crystal layer 12'. The nematic liquid crystal has a variety of types so that a suitable material for the liquid crystal layer 12' can be selected among a wide range.

A pair of polarizing plates 28' and 29' are attached to the outer faces of the completed liquid crystal cell, thus obtaining a liquid crystal display panel 300 in a normally white type TN (twisted nematic) liquid crystal display mode.

Next, a displaying operation for a color display pixel in the liquid crystal display device of the present example will be described below.

(1) Under application of zero voltage to the liquid crystal layer 12 (During displaying white)

Unpolarized light is radiated from the backlight 301 to the liquid crystal display panel 300. When the light passes through the polarizing plate 29', the light is linearly polarized, then goes into the liquid crystal display cell. In the liquid crystal layer 12', the polarization direction of the linearly polarized light is rotated by 90° in accordance with the twist of the liquid crystal molecules. Herein, a red picture element will be described for example.

Light emitted from the liquid crystal layer 12' goes into the red color filter 19(R)' for reflecting light having a wavelength of cyan (i.e., transmitting red light) in the second reflective color filter layer 18'. Red light transmitted through the red color filter 19(R)' passes through the red color filter 15(R)' for transmitting red light, in the first absorptive color filter layer 14', and then passes through the polarizing plate 28'. Thus, red color is displayed.

On the other hand, cyan light is reflected by the red color filter 19(R)' in the second reflective color filter layer 18'. In this point, since the polarization state is maintained, the light passes through the liquid crystal layer 12' with remaining linearly polarized. In the liquid crystal layer 12', the polarization direction of the reflected cyan light is rotated by 90°. As a result, the polarization direction is the same as when the light has entered the liquid crystal display cell, and then the light passes through the polarizing plate 29'. The light transmitted through the polarizing plate 29' returns to the optical guide plate 31' in the backlight 301. Thereafter, the light is again reflected by the reflecting film 32', and passes through color filters 20(G)' and 16(G)' corresponding to green picture elements adjacent to the red picture element, or the color filters 21(B)' and 17(B)' corresponding to blue picture elements. Thus, a viewer recognizes the colors. By having such a structure, light (in this case, cyan light), which is conventionally absorbed in the color filters, can be ,utilized in other picture elements substantially without being absorbed.

Similarly, in the case of green and blue picture elements, light which is conventionally absorbed in the color filters can be utilized in other picture elements by being reflected toward the liquid crystal layer 12. Consequently, as a whole, light is utilized three times more efficiently than in a conventional liquid crystal display device.

Furthermore, since light surrounding the liquid crystal display device is absorbed by the first absorptive color filter layer 14', no light is reflected by the second reflective color filter layer 18' to be directed to the viewer. More particularly, the first color filter layer's respective color filters 15(R)', 16(G)' and 17(B)' absorb all light except for its respective colored light which it allows to pass through (e.g., 15(R)' allows red to pass through). The light which is allowed to pass through is reflected and scattered until it reflects upon a filter of corresponding color and is allowed to pass through. Consequently, light surrounding the display device is not reflected back to the viewer by the second color filter layer 18'.

(2) Upon application of a voltage to the liquid crystal layer 12' (During displaying black)

Unpolarized light is radiated from the backlight 301 to the liquid crystal display panel 300. When the light passes through the polarizing plate 29', the light becomes linearly polarized, before entering the liquid crystal display cell. Since a voltage is applied to the liquid crystal layer 12', the polarization direction thereof does not rotate in the liquid crystal layer 12'. Herein, again, the red picture element will be described for example below.

Light emitted from the liquid crystal layer 12' enters the red color filter 19(R)' for reflecting light having a wavelength of cyan (i.e., transmitting red light) via the second reflective color filter layer 18'. Red light transmitted through the red color filter 19(R)' passes through the red color filter 15(R)' for transmitting red light in the first absorptive color filter layer 14'. The transmitted red light is absorbed in the polarizing plate 28', because the polarization direction is not rotated in the liquid crystal layer 12'.

On the other hand, cyan light is reflected by the red color filter 19(R)' in the second reflective color filter layer 18'. At this point, since the polarization state is maintained, the light passing through the liquid crystal layer 12' will remain linearly polarized. Since a voltage is applied to the liquid crystal layer 12', the polarization direction thereof does not rotate in the liquid crystal layer 12'. Thus, the reflected cyan light has the same polarization direction as the light that entered the liquid crystal display cell. As a result, the reflected light passes through the polarizing plate 29', and returns to the optical guide plate 31' in the backlight 301. Thereafter, the light is again reflected by the reflecting film 32', and passes through color filters 20(G)' and 16(G)' corresponding to green picture elements adjacent to the red picture element, or the color filters 21(B)' and 17(B)' corresponding to blue picture elements. The respective light that is transmitted through these green and blue picture elements is absorbed by the polarizing plate 28'.

Similarly, in the case of green and blue picture elements, light reflected by the color filters 20(G)' and 21(B)' in the second color filter layer 18' pass through other picture elements adjacent to the picture elements, and is absorbed in the polarizing plate 28'. Consequently, black is displayed upon application of a voltage.

Figure 6:
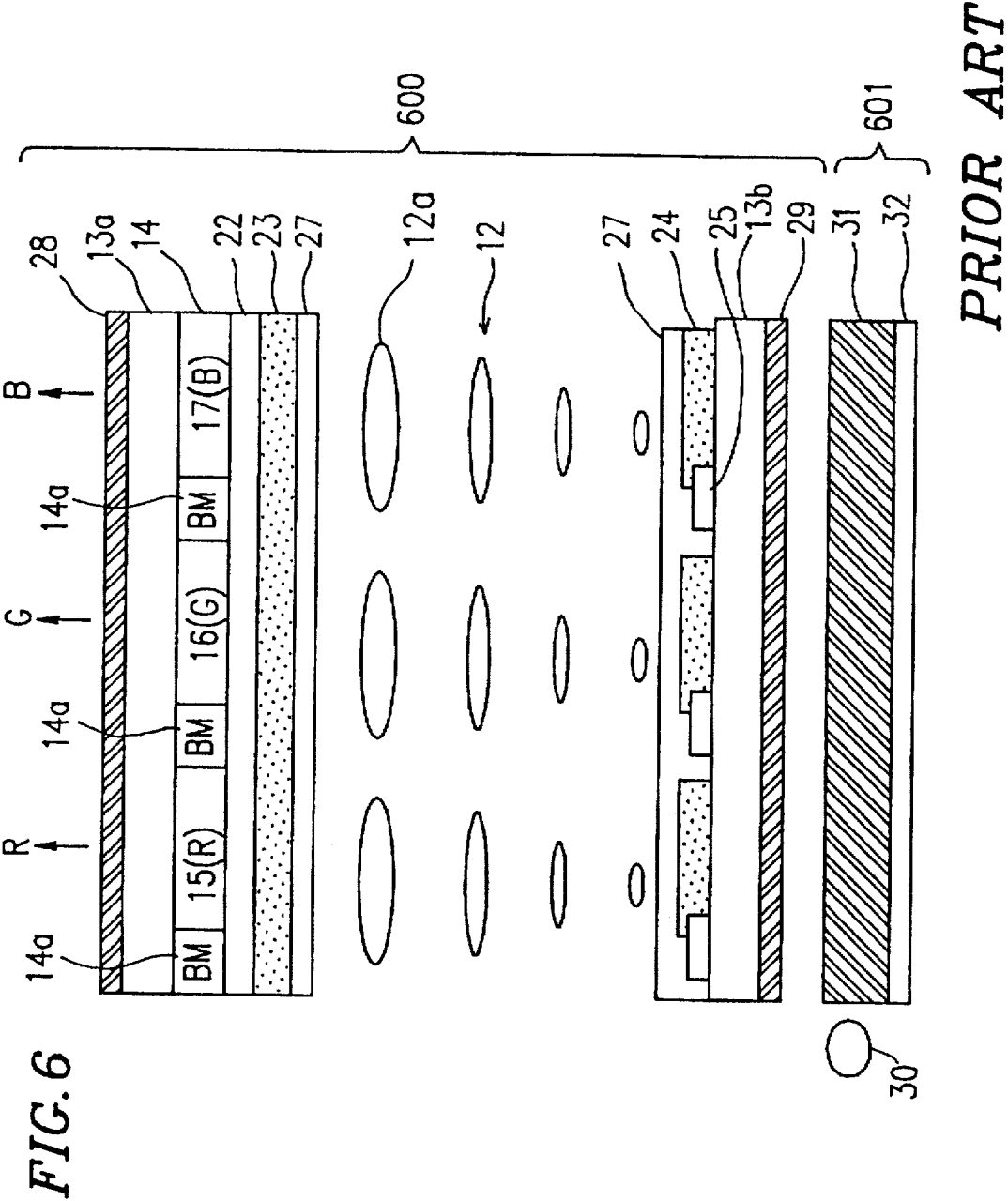
FIG. 6 is a cross sectional view illustrating a conventional transmissive display device.

As described above, although light is conventionally absorbed in the color filters during the display of white, no light is absorbed in the color filters according to the present invention. As a result, in the liquid crystal display device of the present invention, light is utilized three times more efficiently than a liquid crystal display device using the conventional structure shown in FIG. 6.

Consequently, since the liquid crystal display device of the present invention affords for more efficiency utilization of light, a significantly brighter display can be achieved, even if the amount of light from the backlight 301 is suppressed. Accordingly, a liquid crystal display device of low power consumption is realized.

Although a TN type liquid crystal display mode is applied in the present example, an STN display mode, a guest-host display mode, or other display modes for displaying color using color filters such as ferroelectric liquid crystal, polymer dispersing type can be employed in the present invention.

Furthermore, the absorptive color filter used for the first color filter layer 14' can be produced by a variety of methods such as a gelatin dyeing method, an electro-deposition method or a printing method. Furthermore, an inorganic multilayer film, a volume hologram and chiral nematic or cholesteric liquid crystal utilizing selective reflection can be used for a reflective color filter used as the second color filter layer 18'.

Example 2

Figure 4:
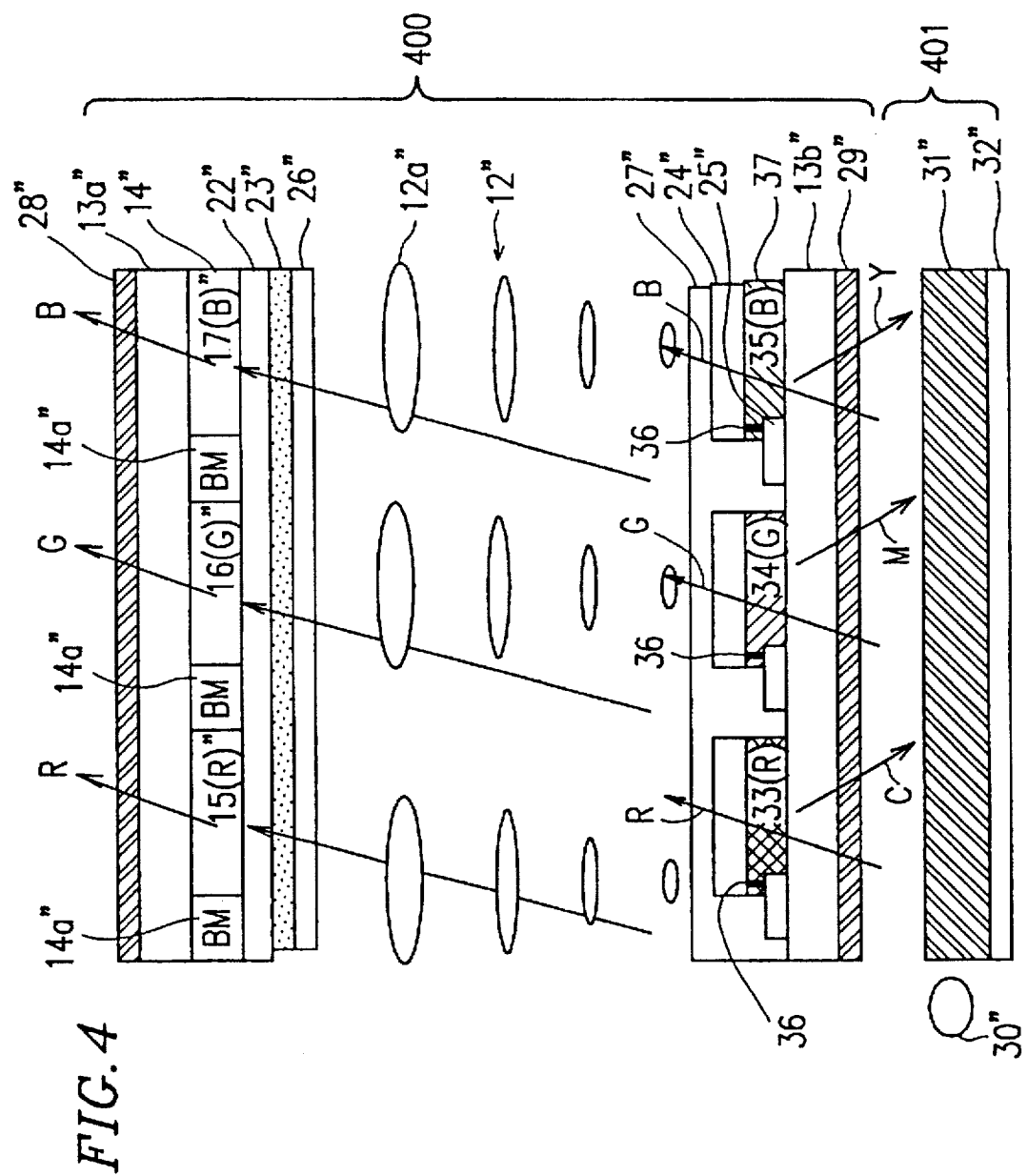
FIG. 4 is a cross sectional view illustrating one color display pixel of an active matrix color liquid crystal display device in Example 2 of the present invention.

Referring to FIG. 4 which illustrates a cross sectional view of another embodiment of a color display pixel for an active matrix color liquid crystal display device of the present invention. The one color display pixel consists of three picture elements for red, green and blue colors. The structure of a liquid crystal display device according to the present example will be described below.

The liquid crystal display device includes a liquid crystal display panel 400 and a backlight 401. The liquid crystal display panel 400 includes a liquid crystal cell including a liquid crystal layer 12" working as a display medium and a pair of transparent substrates 13a" and 13b" opposed to each other. The liquid crystal layer 12" including liquid crystal molecules 12a" is interposed between the pair of transparent substrates 13a" and 13b". Nematic liquid crystal which has molecules twisted at a angle of 90° is used for the liquid crystal layer 12".

A first color filter layer 14" formed by dispersing pigment to selectively transmit red, green and blue light is provided on the surface facing the liquid crystal layer 12" of the substrate 13a" which is disposed closer to the viewer. As shown in FIG. 4, in the first color filter layer 14", a red color filter 15(R)", a green Color filter 16(G)" and a blue color filter 17(B)" are aligned so that each color filter corresponds to a single picture element in the one color display pixel. Black masks 14a" are provided between the color filters 15(R)", 16(G)" and 17(B)". In the present example, red, green and blue color filters 15(R)", 16(G)" and 17(R)" are adjacently aligned to form a stripe, for example.

A second color filter layer 37 is provided on the surface facing the liquid crystal layer 12" of the substrate 13b" opposed to the substrate 13b". Herein, a reflective thin interference color filter layer is used for the second color filter layer. Color filters in the second color filter layer 37 are selected so as to reflect light having a color complementary to that of the light transmitted through the first color filter layer 14". More specifically, a color filter 33(R) for reflecting cyan light (i.e., transmitting red light) is selected with respect to the red color filter 15(R)". A color filter 34(G) for reflecting magenta light (i.e., transmitting green light) is selected with respect to the green color filter 16(G)". A color filter 35(B) for reflecting yellow light (i.e., transmitting blue light) is selected with respect to the blue color filter 17(B)".

A transparent polarization film 22" is formed on the surface facing the liquid crystal layer 12" of the first color filter layer 14". A transparent electrode 23" functioning as a common electrode for the picture elements are formed on the surface facing the liquid crystal layer 12" of the polarization film 22". On the other substrate 13b", a transparent electrode 24" functioning as a picture element electrode and a TFT 25" are formed for every picture element on its surface facing the liquid crystal layer 12". The transparent electrodes 24" are formed on the inorganic thin interference color filter layer 37 so that the inorganic thin interference color filter layer 37 can also function as an insulating film for insulating between the transparent electrodes 24" and TFTS 25". The transparent electrodes 24" are connected to the drain portions of the TFTs 25" via contact holes 36 provided in the color filter layer 37. Alignment films 26" and 27" made of polyimide for aligning liquid crystal are applied onto transparent electrodes 23" and 24", respectively.

In the present example, by utilizing the color filter layer 37 as an insulating film, the transparent electrodes 24" can be formed even on the TFTs 25" so that an aperture ratio can be raised advantageously.

The liquid crystal display panel 400 further includes polarizing plates 28" and 29" attached to the outer faces of the transparent substrates 13a" and 13b" of the liquid crystal display cell, respectively.

The backlight 401 is provided outside of the liquid crystal display panel 400, and includes a light source 30", an optical guide plate 31" and a reflecting film 32".

Still referring to Example 2, the liquid crystal display panel 400 having the above-mentioned structure is produced in the following manner:

First, the absorptive color filter layer 14" is formed on the transparent substrate 13a", made of barium borosilicate glass, sodium glass, plastic, quartz glass or the like. A color filter obtained by a pigment dispersion method may be used for the absorptive color filter layer 14", for example. The color filter being produced in the following manner:

A photosensitive dye resist in which a red pigment is uniformly dispersed in a transparent photosensitive resin is applied onto the glass substrate 13a" in order to form a predetermined pattern. This procedure is repeated three times, so as to form the first color filter 14" consisting of color filters 15(R)", 16(G)" and 17(B)" for red, green and blue. The detailed procedure is the same as that in Example 1.

On the other hand, on the substrate 13b" opposed to substrate 13a" are formed TFTs 25" working as switching devices, as shown in FIG. 4. The interference color filter for the second color filter layer 37 is formed on the counter substrate 13b" provided with the TFTs 25" by alternately laminating two types of transparent inorganic dielectric thin film having different refractive indexes. In the present example, silicon dioxide (having a refractive index of 1.46) is used as a substance having a lower refractive index. Titanium dioxide (having a refractive index of 2.4) is used as a substance having a higher refractive index. Detailed conditions of the interference filter are shown below.

$SiO_2$ and $TiO_2$ are subjected to sputtering in order to form thin films. The thin films are alternately laminated on the substrate 13b", so as to form a multilayer. Thus, an interference filter working as the second color filter layer 37 is obtained. The number of layers and thickness are optimized for transmitting red, blue and green light, respectively. When the number of layers of the transparent dielectric thin film is increased, a spectral characteristic becomes sharp so that an interference filter with excellent color separation characteristics can be obtained. For example, the entire thickness is set to 0.821 μm for the red color filter 33(R), the entire thickness is set to 1.725 μm for the green color falter 34(G) and the entire thickness is set to 1.052 μm for the blue color filter 35(G).

Thereafter, the photo-process of application of a photoresist, exposure and development is repeated three times so as to form red, green and blue color filters 33(R), 34(G) and 35(B). During the photo-process, a mask is disposed in such a manner that contact holes 36 are formed on the color falters 33(R), 34(G) and 35(B) so as to correspond to the drain portions of the TFTs 25". Thus, transparent electrodes 24" made of ITO are formed on the inorganic thin film interference color filter layer 37.

The first color filter layer 14" and the second color filter layer 37 are disposed so that respective picture elements overlap each other. The combination thereof is shown in Table 4 below.

TABLE 4

|  | Red picture element | Green picture element | Blue picture element |
| --- | --- | --- | --- |
| First color filter layer 14" | Transmitting red light, Absorbing cyan light | Transmitting green light, Absorbing magenta light | Transmitting blue light, Absorbing yellow light |
| Second color filter layer 37 | Transmitting red light, Reflecting cyan light | Transmitting green light, Reflecting magenta light | Transmitting blue light, Reflecting yellow light |

As can be seen from Table 4, a light to be transmitted through the first color filter layer 14" is selected to have a color complementary to that of light reflected by the color filter layer 37.

An acrylic resin working as the polarization film 22" is coated on the first color filter layer 14" by a spinner. Then, the resultant film is baked at 220°C. for 60 minutes. Furthermore, transparent electrodes 23", for example, ITO is formed with a thickness of 100 nm on the entire surface of the polarization film 22".

Alignment films (Optomar AL4552 manufactured by Japan Synthetic Rubber Co., Ltd.) 26" and 27" are formed with a thickness of 70 nm on the transparent electrodes 23" and 24" by a printing method. Rubbing direction is set so that liquid crystal molecules are twisted at 90° between the substrates 13a" and 13b".

The pair of substrates 13a" and 13b" are attached to each other by using spacers so that the cell thickness is 4.5 μm. Nematic liquid crystal is injected between the attached substrates 13a" and 13b" in order to form the liquid crystal layer 12". In the present example, ZLI-4792 (manufactured by Merck & Co., Inc.) is used for the liquid crystal layer 12". The nematic liquid crystal his such a variety of types that a material for the liquid crystal layer 12" can be selected in a wide range.

A pair of polarizing plates 28" and 29" are attached on the outer face of the completed liquid crystal cell, thus obtaining a liquid crystal display panel 400 in a normally white type TN (twisted nematic) liquid crystal display mode. The operating principle of the present example is the same as that in Example 1.

In the present example, as well as in Example 1, substantially no light is absorbed by the color filters while displaying white, though light is typically absorbed by conventional color filters. Thus, light is utilized three times more efficiently as compared to a conventional liquid crystal display device.

As described above, since the liquid crystal display device of the present example provides a high efficiency of light utilization, light amount from the backlight 401 can be suppressed. Thus, a low power consuming liquid crystal device can be attained.

Although the TFT is used as an active device in the present example, a two-terminal device (e.g., MIM, a varistor or the like) can be used for driving the liquid crystal.

Example 3

A liquid crystal display device in Example 3 of the present invention has the same structure as the liquid crystal display device in Example 1 shown in FIG. 3, and uses a cholesteric liquid crystal polymer as the second reflective color filter layer 18'. The cholesteric liquid crystal polymer utilizes selective reflection of circularly polarized light stemmed from a helical structure of the cholesteric liquid crystal layer.

As the cholesteric liquid crystal polymer of the present example, photopolymerizable TC3951L manufactured by Wacker-Chemie GmbH Co., Ltd. is used. TC3951L is capable of changing a reflection spectrum at a specific temperature by a thermochromic effect of a cholesteric phase due to temperature dependant of a helical twisting power of a chiral material. The cholesteric liquid crystal polymer of the present example is produced in the following manner:

First, a film made of TC3951L is formed on a first color filter layer 14'. A predetermined mask corresponding to picture elements is disposed thereon. When a glass substrate 13a' is heated to 25° C., red light is reflected. Maintaining this state, UV rays are radiated, so as to fix an area of the filter where red light is reflected. Next, a temperature of the substrate 13a' is set to 76° C., at which green light is reflected. A predetermined mask corresponding to picture elements is disposed, and then UV rays are radiated so as to fix an area of the filter where green light is reflected. Then, the temperature of the substrate 13a is changed to 105°C., at which blue light is reflected. A predetermined mask corresponding to picture elements is disposed, and then UV rays are radiated so as to fix an area of the filter where blue light is reflected. In this manner described above, a reflective RGB filter is formed.

Furthermore, another film made of TC3951L is formed on the reflective filter. A predetermined mask corresponding to picture elements is disposed, so as to form a blue-reflecting filter on the area of the red-reflecting filter, a red-reflecting filter on the area of the green-reflecting filter and a blue-reflecting filter on the area of green-reflecting filter.

In this manner, a green color filter 20(G)' for reflecting magenta, blue color filter 21(B)' for reflecting yellow and a red color filter 19(R)' for reflecting cyan light are formed as the second reflective color filter layer 18'. These color filters 19(R)', 20(G)' and 21(B)' in the second color filter layer 18' are combined with the color filters 15(R)', 16(G)' and 17(B)' in the first color filter layer 14', corresponding to respective picture elements, respectively, as shown in Table 3.

The liquid crystal display devine in Example 3 has the same structure as that in Example 1 shown in FIG. 3, except for the structure of the second color filter layer 18'. By applying the structure of the present example, substantially no light is absorbed in the color filters while displaying white, though light is typically absorbed by conventional color filters. Thus, light is utilized three times more efficiently.

The liquid crystal display device of the present example also has a high light utilization efficiency so that amount of light from the backlight 301 can be suppressed. Consequently, a low power consuming liquid crystal display device can be attained.

Example 4

Figure 5:
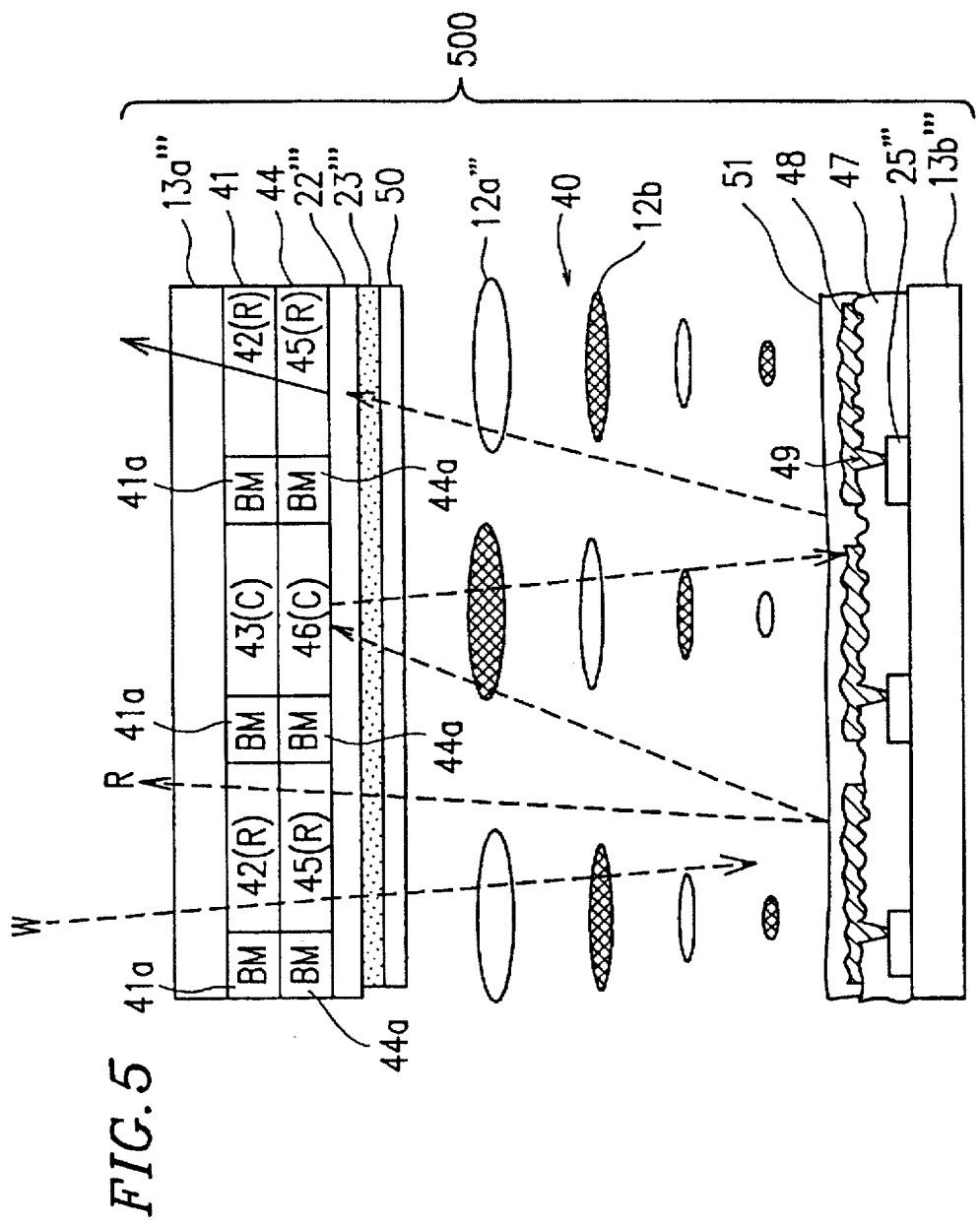
FIG. 5 is a cross sectional view illustrating one color display pixel of an active matrix color liquid crystal display device in Example 4 of the present invention.

FIG. 5 shows a cross sectional view of one color display pixel of an active matrix color liquid crystal display device in Example 4 of the present invention. The one color display pixel consists of three picture elements for red, green and blue colors. Referring to FIG. 5, a structure and a production method of a reflective liquid crystal display device according to the present example will be described below.

The liquid crystal display device of the present example includes a liquid crystal display panel 500. The liquid crystal display panel 500 includes a liquid crystal layer 40 working as a display medium and a pair of transparent substrates 13a''' and 13b''' opposed to each other. The liquid crystal layer 40 is interposed between the pair of transparent substrates 13a''' and 13b'''. Guest-host liquid crystal including a chiral substance, a liquid crystal molecule 12b''' and a black dichroic pigment 12b, which conducts display in a phase change mode, is used for the liquid crystal layer 40.

A first color filter layer 41 obtained by a dyeing method to selectively transmit red light and cyan light is provided on the surface facing the liquid crystal layer 40 of the substrate 13a''' which is disposed closer to a viewer. As shown in FIG. 5, in the first color filter layer 41, a red color filter 42(R) and a cyan color filter 43(C) are aligned so that each color filter corresponds to a single picture element in the one color display pixel. A black mask 41a is provided between the color filters 42(R) and 43(C). In the present example, the red and cyan color filters 42(R) and 43(C) are adjacently aligned to form a strip, for example.

A second color filter layer 44 is provided on the surface facing the liquid crystal layer 40 of the first color filter layer 41. Herein, a reflective volume hologram optical color filter is used for the second color filter layer 44. The second color filter layer 44 is a phase type volume hologram optical film obtained by laminating layers having different refractive indexes in the color filter layer. The second color filter layer 44 is produced in the same manner as in Example 1. The second color filter layer 44 includes a red color filter 45(R) and a cyan color filter 46(c) for selectively transmitting red light and cyan light. A black mask 44a is provided between the color filters 45(R) and 46(C) in the same manner as in the case of the first color filter layer 41.

The first color filter layer 41 and the second color filter layer 44 are disposed so that respective picture elements overlap each other. The combination thereof is shown in Table 5 below.

TABLE 5

|  | Red picture element | Cyan picture element |
| --- | --- | --- |
| First color filter layer 41 | Transmitting red light, Absorbing cyan light | Transmitting cyan light, Absorbing red light |
| Second color filter layer 44 | Transmitting red light, Reflecting cyan light | Transmitting cyan light, Reflecting red light |

As can be seen from Table 5, a light to be transmitted through the first color filter layer 41 is selected so as to have a color complementary to the light reflected by the color filter layer 44.

A polarization film 22''' and a transparent electrode 23''' working as a common electrode for respective picture elements are provided on the second color filter layer 44. The polarization film 22''' is formed by coating an acrylic resin by a spinner and then baking at 220° C. for 60 minutes. The transparent electrodes 23''', for example, ITO is formed in a thickness of 100 nm on the entire surface of the polarization film 22'''.

On the other substrate 13b''', a reflective electrode 48 working as a picture element electrode and a TFT 25''' working as a switching device are formed for every picture element on its surface facing the liquid crystal layer 40. An organic insulating film 47 is provided between the reflective electrode 48 and the TFT 25'''. The organic insulating film 47 has a rough face for scattering light on the side of the liquid crystal layer 40. The reflective electrodes 48 and the drain portions of the TFTs 25''' are electrically connected via contact holes 49 provided in the organic insulating films 47. With such a structure, a large aperture ratio can be attained.

The rough face for scattering light of the organic insulating film 47 is produced in accordance with the method disclosed in Japanese Laid-Open Patent Publication No. 6-75238. Aluminum is used for the reflective electrode 48. The surface facing the liquid crystal layer 40 of the reflective electrode 48 is also as rough as the rough face of the organic insulating film 47.

Vertical alignment films 50 and 51 are formed with a thickness of 70 nm on the transparent electrodes 23''' and the reflective electrodes 48 by a printing method, respectively. The substrates 13a''' and 13b''' are attached to each other so that the thickness of the panel is 8 μm. Guest-host liquid crystal including a chiral substance and a black dichroic pigment which conduct display in a phase change mode is injected between the attached substrates 13a''' and 13b''' in order to form the liquid crystal layer 40. The black guesthost liquid crystal has such a variety material that the material for the liquid crystal layer can be selected from a wide range.

Still referring to Example 4, a displaying operation in the liquid crystal display device will next be described below.
(1) Under application of a voltage to the liquid crystal layer 40 (While displaying white)

Liquid crystal molecules and pigment molecules in the liquid crystal layer 40 are aligned in the same direction as an applied electric field. As a result, light will pass through the liquid crystal layer 40. Light surrounding the liquid crystal display cell 500 is first incident to the first color filter layer 41. Light having wavelength other than that of the transmitted light is absorbed in the first color filter layer 41. Herein, red picture elements will be described for example.

In the red picture elements, red light transmitted through the red color filter 42(R) in the first color filter layer 41 goes into the red color filter 45(R) in the second color filter layer 44, which is an interference color filter. The red light passes through the color filter 45(R), and then passes through liquid crystal layer 40 so as to be scattered in the reflective electrodes 48. The red light transmitted through the color filters 42(R) and 45(R) is reflected by the reflective electrodes 48, and passes through the liquid crystal layer 40 again, following a substantially reverse path to the path when the light has been incident. In this manner, the light transmitted through the color filters of red 42(R) and 45(R) are recognized by a viewer.

Since the light transmitted through the first and second color filter layers 41 and 44 corresponding to red picture elements are scattered by the reflective electrodes 48, the light does not necessarily emit from the red picture element through which the light had initially entered. However, even if the light enters a cyan picture element adjacent to the red picture element, the incident light is reflected by the interference color filter working as the second color filter layer 44 so as to pass through the liquid crystal layer 40 and again enters the reflective electrodes 48. In the reflective electrodes 48, the light is rebounded and again directed toward the viewer, and eventually utilized.

In a conventional structure, the incident light to the adjacent cyan picture element is absorbed in absorptive color filters. In the present invention, however, such light that is otherwise absorbed can be utilized efficiently.
(2) Under application of no voltage (During displaying black)

When light surrounding the liquid crystal display device enters the liquid crystal layer 40, the light is absorbed in the guest-host liquid crystal, because the liquid crystal molecules of the liquid crystal layer 40 are twisted. Even if some light is not absorbed, the light is reflected by the interference color filter working as the second color filter layer 44, and then absorbed in the guest-host liquid crystal layer 40 so as to realize the black display.

Although, the interference color filter working as the second color filter layer 44 is formed on the side of the substrate 13a'" in the present example, it is confirmed that the same effect can be obtained when it is formed in the, side of the substrate 13b'".

By applying the structure the present example, in a reflective display device, substantially no light reflected by reflecting plates (reflective electrodes) is absorbed by color filters, though the reflected light is conventionally absorbed. Thus, light is utilized efficiently.

Although a TFT is used for an active device in the present example, a two-terminal device (e.g., MIM, a varistor or the like) can be used for driving liquid crystal.

Although the first color filter layer 41 is formed by an absorptive gelatin dyeing method in the present example, it can be formed by a pigment dispersion method, an electro-deposition method, a printing method or other methods. Furthermore, an interference color filter is used for the second reflective color filter layer 44, but volume hologram, chiral nematic or cholesteric liquid crystal or the like utilizing selective reflection can be used.

As apparent from the description above, according to the present invention, a bright liquid crystal display device capable of efficiently utilizing light can be realized. In a transmissive liquid crystal display device, brightness of the same level as a conventional device can be ensured with less power consumption than conventional liquid crystal display devices. Furthermore, by applying the present invention to a reflective liquid crystal display device a bright reflective panel can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color display device comprising:
   a display medium;
   a display-side substrate including electrodes for driving the display medium;
   a counter substrate opposed to the display-side substrate with the display medium therebetween and including electrodes for driving the display medium;
   a first absorptive color filter provided on the display-side substrate;
   a second reflective color filter for reflecting light having a complementary color of light transmitted through the first color filter, the second color filter being provided on the first color filter so as to form a multilayer together with the first color filter;
   reflecting means provided on a face opposite to the first color filter of the second color filter; and
   a backlight provided on a side opposite to the display-side substrate of the counter substrate.

2. A color display device according to claim 1, wherein the first color filter is formed by either one of a gelatin dyeing method, a pigment dispersing method, an electro-deposition method or a printing method.

3. A color display device according to claim 1, wherein the second color filter is formed by either one of an inorganic multilayer, a volume hologram, chiral nematic liquid crystal, cholesteric liquid crystal or a cholesteric liquid crystal polymer.

4. A color display device comprising:
   a display medium;
   a display-side substrate including electrodes for driving the display medium;
   a counter substrate opposed to the display-side substrate with the display medium therebetween and including reflective electrodes for driving the display medium;
   a first absorptive color filter provided on the display-side substrate; and
   a second reflective color filter provided on a face opposite to the display-side substrate of the first color filter for reflecting light having a color complementary to that of light transmitted through the first color filter.

5. A color display device according to claim 4, wherein the second color filter is provided on the display-side substrate so as to form a multilayer together with the first color filter.

6. A color display device according to claim 4, wherein the second color filter is provided on the side of the counter substrate.

7. A color display device according to claim 4, wherein the first color filter is formed by a method selected from the group consisting of a gelatin dyeing method, a pigment-dispersing method, an electro-deposition method, and a printing method.

8. A color display device according to claim 4, wherein the second color filter is formed by an element selected from the group consisting of: an inorganic multilayer, a volume hologram, a chiral nematic liquid crystal, a cholesteric liquid crystal, and a cholesteric liquid crystal polymer.

* * * * *